United States Patent [19]

Hofmeyer

[11] Patent Number: 5,251,956
[45] Date of Patent: Oct. 12, 1993

[54] FOLDABLE TABLE ATTACHMENT FOR A COLLAPSIBLE CHAIR

[75] Inventor: Willis J. Hofmeyer, Sergeant Bluff, Iowa

[73] Assignee: Dawn Martinson, Sergeant Bluff, Iowa

[21] Appl. No.: 615,123

[22] Filed: Nov. 19, 1990

[51] Int. Cl.⁵ ............................................. A47B 3/14
[52] U.S. Cl. ................................. 297/173; 403/191; 297/144
[58] Field of Search .............. 297/173, 135, 144, 188, 297/438, 433, 429; 108/42, 48, 152; 403/191

[56] References Cited

U.S. PATENT DOCUMENTS

| | | | |
|---|---|---|---|
| 1,234,309 | 7/1917 | Dubben | 297/173 |
| 2,046,942 | 7/1936 | Goeller | 403/191 X |
| 3,894,496 | 7/1975 | Phillips et al. | 297/135 X |
| 4,007,993 | 2/1977 | Schwartz | 403/191 X |
| 4,345,793 | 8/1982 | Duda | 297/438 |
| 4,553,785 | 11/1985 | Duke, Jr. | 297/229 |

Primary Examiner—Kenneth J. Dorner
Assistant Examiner—J. Bonifanti
Attorney, Agent, or Firm—Law Offices of John A. Beehner

[57] ABSTRACT

A foldable table attachment is connected to the side bar of a collapsible chaise lounge for pivotal movement between a storage position and overlying engagement with a surface of the seat portion of the chaise lounge and a use position wherein the table top extends generally horizontally outwardly from the seat portion. A pivotal leg structure on the table top is pivotal from a storage position parallel to the table top to a use position extended downwardly from the table top for ground support. Upon pivotal movement of the table legs and table top to their storage position and upon collapsing of the back and leg support panels of the chaise lounge and leg members of the chaise lounge to their storage positions, the collapsed lounge chair may be stored in the same space required for storage of the chair alone.

6 Claims, 3 Drawing Sheets

FOLDABLE TABLE ATTACHMENT FOR A COLLAPSIBLE CHAIR

BACKGROUND OF THE INVENTION

The present invention is directed generally toward a foldable table attachment for a collapsible chair and more particularly to such a table attachment for a chaise lounge of the type having front and back panels pivotally connected to opposite ends of a seat portion and legs pivotally foldable against the underside of the seat portion.

Collapsible chairs, also known as chaise lounges, have been in existence for a long time and are well known in the art. The chairs are commonly used by sunbathers at the beach or in the backyard and may be found in one form or another in almost every home.

One disadvantage of presently available collapsible chaise lounges of the type described is the lack of any available sturdy surface on which to place drink glasses, books and the like. The usual solution is to set such articles on the ground or to provide a self standing table in addition to the chair. The requirement of the self standing table defeats one of the principle advantages of the collapsible table, saving space, since most self standing tables cannot be folded flat. Accordingly, a primary objective of the present invention is to provide a table attachment which may be folded flat within the collapsed chair to facilitate transportability. Additionally, most self standing tables are not designed specifically to be used with collapsible chairs and as a result are too high relative to the chair. Consequently, it is an additional objective of the present invention to provide a table attachment of a height for comfortable use with a collapsible chaise lounge of the type described.

Additionally, it is an objective of the present invention to provide a table attachment which is sturdy but which may be folded into the chair thereby requiring no additional storage space.

Another disadvantage of presently available collapsible lawn furniture is that since the table is a separate piece of furniture, a separate effort must be made to remember to bring the table, increasing the chances that it will be forgotten and left at home. Also, the table may not be readily available, thereby requiring a search for its location and the resulting frustration accompanying such a search. Therefore, it is an additional objective of the present invention to provide a table attachment which is securely connected to the chair thereby eliminating the need to remember and locate the table prior to a recreational outing.

It is an additional objective of the present invention to provide a foldable table which is lightweight, simple and rugged in construction, inexpensive to manufacture and efficient in operation.

U.S. Pat. No. 4,553,785 discloses a cover for lounge chairs including a separate table accessory connectable by down turned tabs insertable through slits in the cover for engaging a side bar of the chair seat. The patented device lacks several features and advantages of the present invention, such as the present invention's secure and relatively permanent connection of the table attachment to the chair side bar resulting in rigidity and stability and negation of the possibility of losing or forgetting the table. Additionally, the table of the present invention may be folded to lie flat on the surface of the chair for storage and transportation without the possibility of damaging the chair's fabric strips as might occur with the patented device.

SUMMARY OF THE INVENTION

The foldable table apparatus of the present invention includes a table surface pivotally connected on one end to the side bar of a collapsible chair and on the other end to a support member serving to maintain the table surface in a substantially parallel orientation relative to the ground surface. The pivotal connection of the table surface to the chair allows the table to be pivoted from the lowered use position, upward and over the chair such that the table will lie flat against the surface at the chair seat in the storage position. The table support member is attached so that the member may be folded flat against the underside of the chair seat. Therefore, the entire foldable table apparatus may be conveniently stored as an integral part of the collapsible chair, not occupying any more space than the chair alone. The table support member may also include rubber foot attachments at the ground contact point to reduce movement of the support member while contacting the ground in the lowered use position.

The method for deploying the folding table includes the steps of: providing the collapsible chair and folding table of the present invention; ensuring the back and leg sections of the collapsible chair are extended; extending the table support member away from the underside surface of the table; pivoting the table surface away from the chair seat in the storage position and around the chair side bar until the support member contacts the ground in the use position, and the leg-locking mechanism holds the leg firmly in the vertical position.

DESCRIPTION OF THE PREFERRED EMBODIMENT

Figure 1:
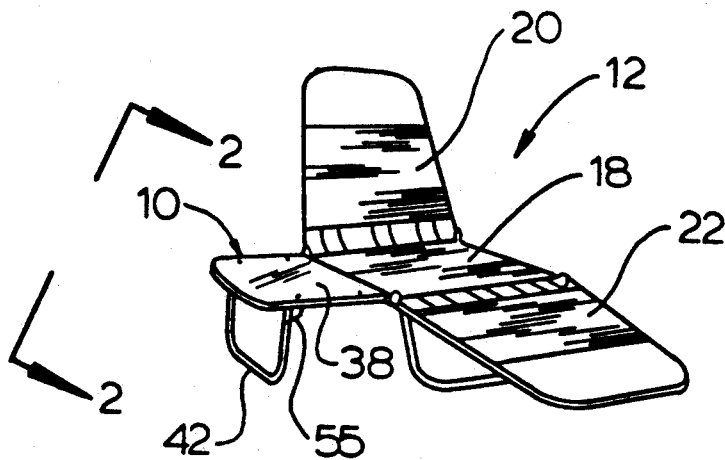
FIG. 1 is a perspective view of a chaise lounge equipped with the foldable table attachment of the invention.
Figure 2:
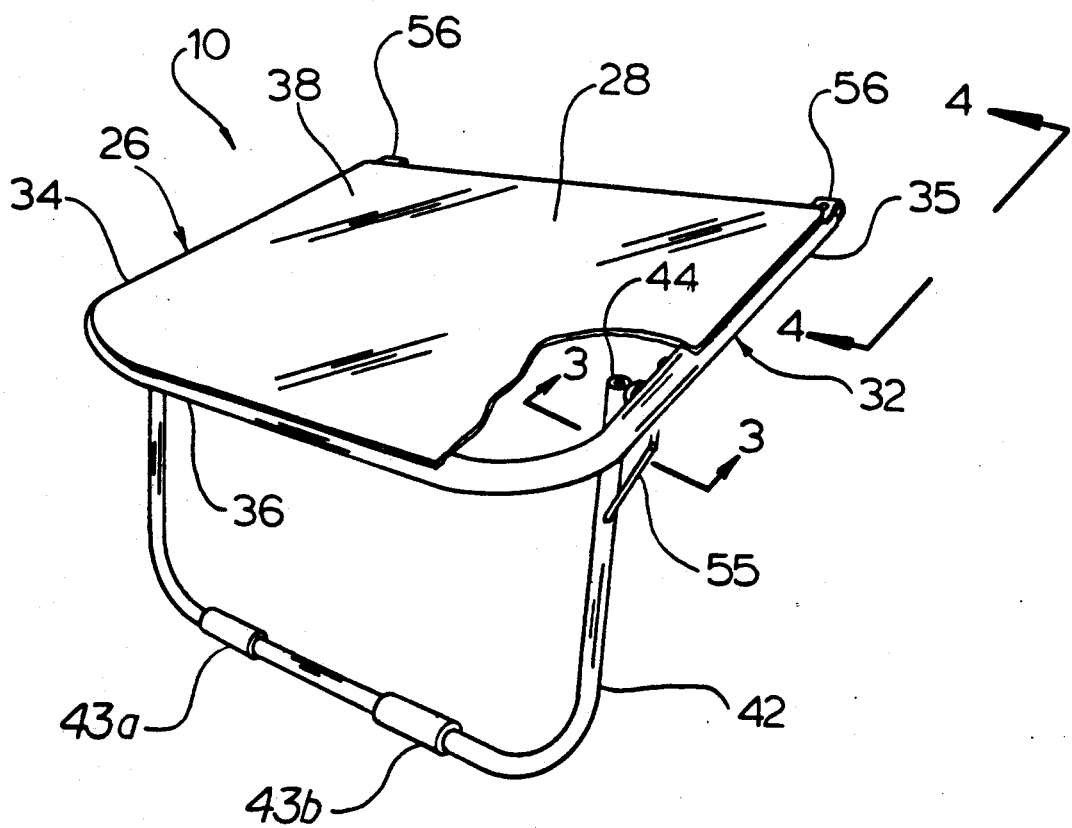
FIG. 2 is an enlarged perspective view of the foldable table attachment of the invention.
Figure 5:
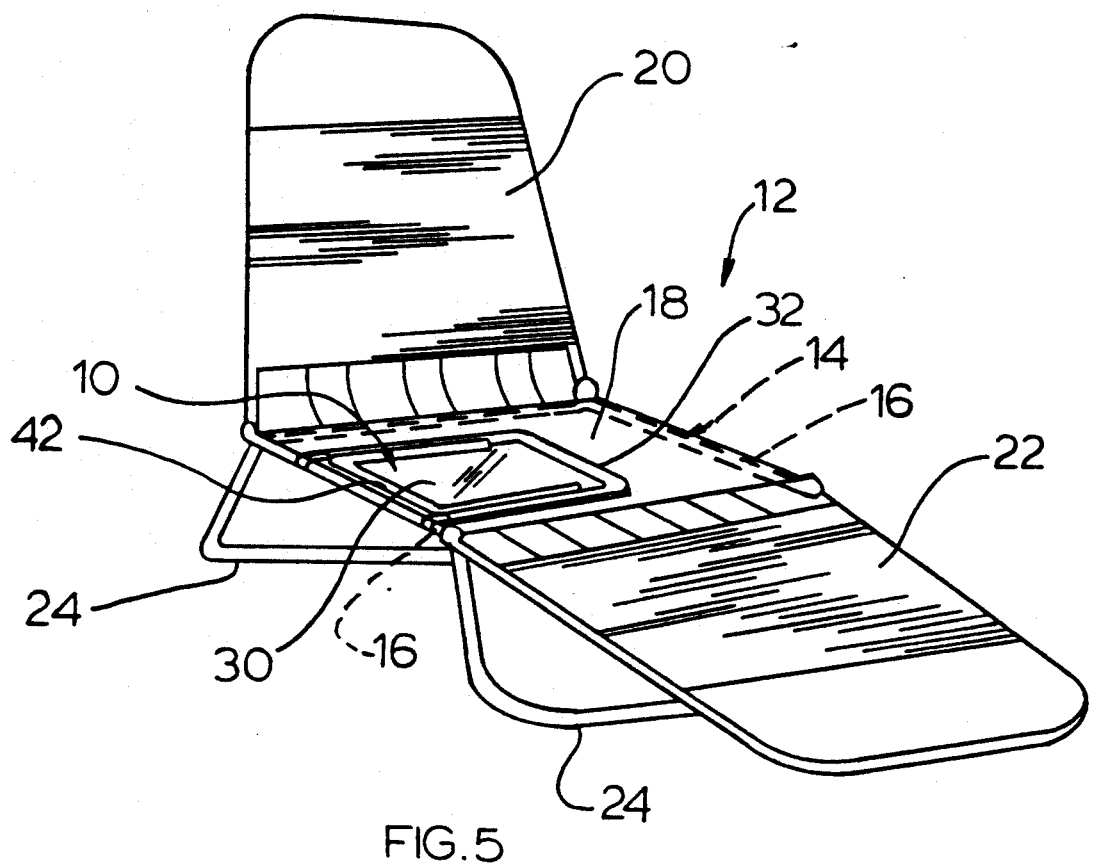
FIG. 5 is a perspective view of a chaise lounge and a foldable table attachment in a storage position thereof.
Figure 6:
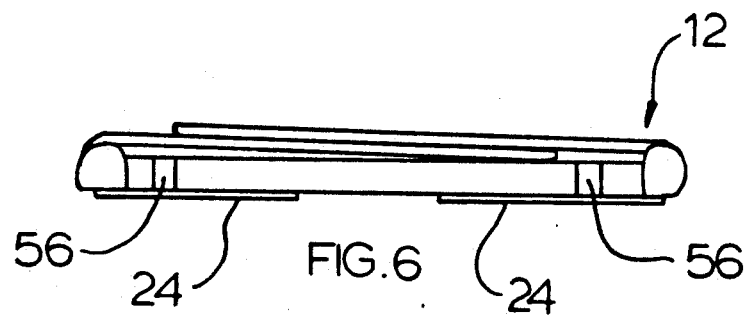
FIG. 6 is a side elevational view of the chaise lounge and table attachment assembly in the collapsed storage position thereof.

The foldable table attachment 10 of the present invention is illustrated in FIG. 1 in assembly relation with a chaise lounge 12. The chaise lounge includes a peripheral seat frame 14, as shown in FIG. 5, including opposite side bars 16 and a flexible seat portion 18 connected to and spanning the side bars for supporting a person seated thereon. Back and leg support panels 20 and 22 are pivotally connected to opposite ends of the seat frame so as to be collapsible in generally stacked relation on top of the seat frame 14 for storage and transport. A pair of folding leg structures 24 are pivotally connected to the seat frame for movement between downwardly and outwardly inclined support positions and storage positions engaged against the underside of the seat portion 18. The connection of the back and leg panels 20 and 22 to the seat portion 18 generally enables the panels to be supported at various selected angles relative to the seat portion.

Figure 3:
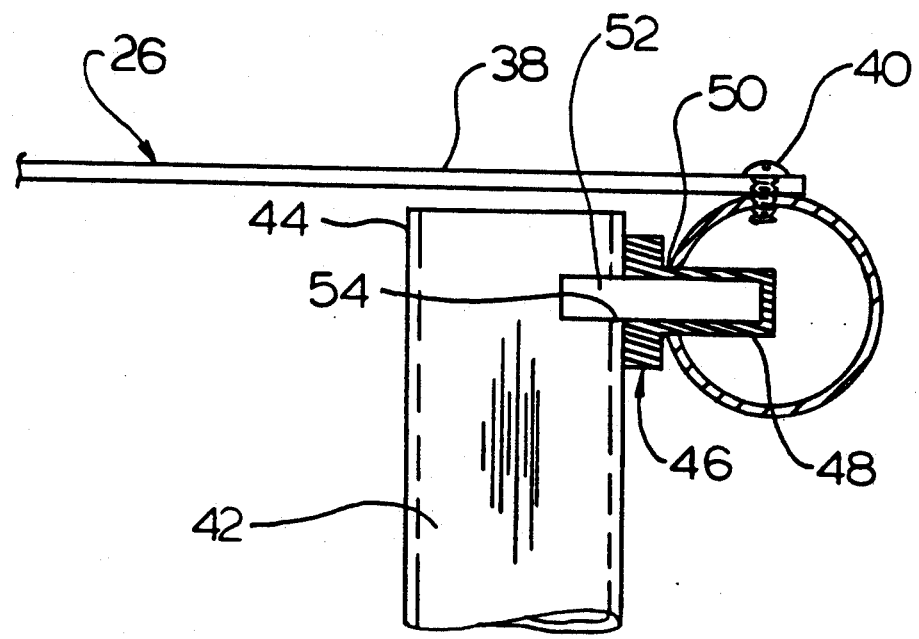
FIG. 3 is a further enlarged detail partial sectional view showing the connection of the table leg structure to the table top.

Table attachment 10 includes a table top 26 having a top side 28 and underside 30. Table top 26 includes a generally U-shaped frame 32 having spaced apart legs 34 and 35 with outer ends connected to an outer cross member 36 and opposite free ends. A top panel 38 spans the legs 34, 35 for supporting articles thereon. The top panel 38 may be secured to the frame 32 by screws 40 or bolts, as indicated in FIG. 3, or by any other suitable means. One alternative would be to provide generally C-shaped down turned tabs on the underside of top panel 38 for snap fit engagement with the tubular members of U-shaped frame 32.

Pivotally connected to the table top frame 32 is a leg means 42, illustrated in the form of a U-shaped member having upper ends connected to the table frame 34/35, such as by the pivotal connectors 46, illustrated in FIG. 3.

Pivotal connector 46 includes a plastic or nylon bushing 48 seated within a side opening 50 in the table frame 32 and a pivot pin 52 rotatably received within the bushing and protruding therefrom a short distance toward the opposite leg. The upper ends 44 of the U-shaped leg means 42 each have an opening 54 on the inner and outer side thereof for receiving a respective pivot pin 52. The U-shaped leg means 42 has sufficient inherent flexibility that the upper ends 44 may be compressed together for alignment of the pivot pins with the frame bushings 44, whereupon the outward bias of the upper ends 44 of the leg retain the leg pivot pins in the frame bushings. In a preferred embodiment, the U-shaped leg means 42 would include a pair of resilient feet 43a and 43b wrapped around the lower section of the U-shaped leg means 42 and made of foam rubber or the like. The feet 43a and 43b act to reduce movement of the U-shaped leg means 42 on the ground.

Also preferred is that the U-shaped leg means 42 may be pivoted from its vertical support position to enable the height of the outer part of the table top 28 to be adjusted relative to the C-shaped brackets 56 described below and thus the leg mean 42 serves as a multiple position support member. The leg means 42 would be held in the desired position by frictional ground contact by the resilient feet 43a and 43b, thus preventing slippage. By pivoting the U-shaped leg means 42, the distance between the outer end of the table top 28 and the ground can be increased or diminished, thereby enabling the table tope 28 to remain substantially horizontal.

Figure 4:
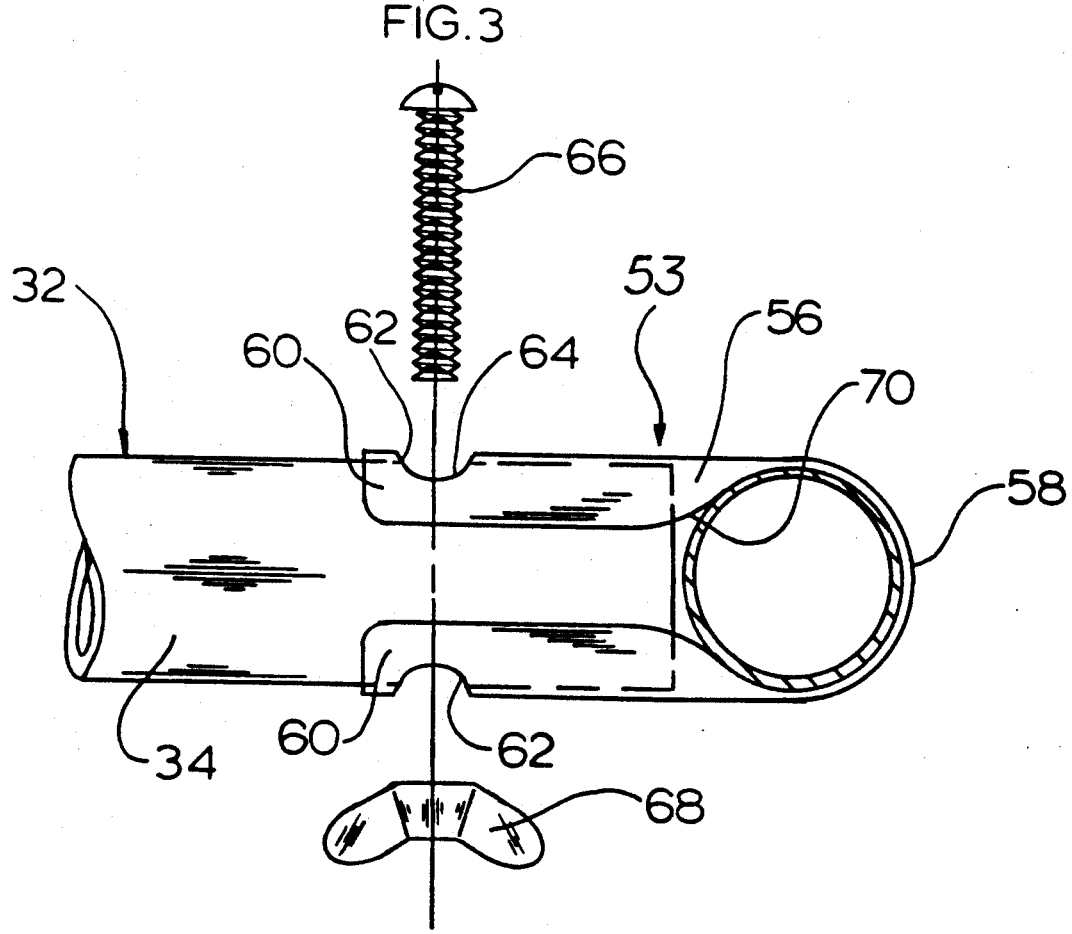
FIG. 4 is an enlarged detail partially sectional exploded view of the connection of the table top frame to a collapsible chair side bar.

The pivotal connectors 53 (FIG. 4) for hingedly connecting the table top 26 to a seat frame side bar 16 includes a pair of generally C-shaped brackets 56, each having a central portion 58 pivotally wrapped around a side bar 16 and opposite free ends 60. The free ends 6 are preferably formed to conform to the outer periphery of the respective frame 34 or 35 so as to define a partial frame receiving sleeve. The free ends 60 have holes 62 adapted for registration with similar holes 64 in the frame 34/35 for receipt of a fasteners such as bolts 66 therethrough. A wing nut 68 secures the table frame 34/35 to the brackets 56 and onto the side bar 16 of chaise lounge 12. As seen in FIG. 4, the bent free ends of the brackets 56 are tapered as at 70 along an arcuate curve to resist axial movement of the table frame 34/35 toward the side bars 16 on which they are pivotally mounted.

The C-shaped brackets 56 enable pivotal movement of the table top 26 from a storage position in generally registered engagement overlying one surface of flexible seat portion 18 to a substantially horizontal use position extended transversely outwardly from the seat frame side bar 16, as illustrated in FIG. 1. Note that the C-shaped brackets 6 impose no limitation to pivotal movement on side bars 16 so the table 26 can be just as easily pivoted downwardly and upwardly against the underside of flexible seat portion 18, if desired.

In a preferred embodiment, the table top U-shaped frame 32 is formed of three quarter inch outside diameter zinc-coated round steel or aluminum tubing. Wall thickness may vary. Since that is a common material for the peripheral seat frame 14 of the type of chaise lounges illustrated herein, the table top 26 is generally positionable substantially within the horizontal extent of the peripheral seat frame 14 when pivoted to its storage position against the top or bottom surface of flexible seat portion 18. The flexibility of seat portion 18 accommodates pivotal movement of the table top to either of these storage positions.

The material of the table top leg means 42 in the preferred embodiment is a half inch outside diameter to ¾ outside diameter whereas wall thickness may vary from 0.029 to 0.049. Since the leg pivot pins 52 intersect the centers of both the leg tubing 42 and table top frame 32, the leg means is easily pivoted to a storage position within the confines of the thickness of the table top frame 32.

As a result, it is seen that upon pivotal movement of the table top legs to the storage position with the table top and upon pivotal movement of the table top into a storage position within the peripheral seat frame 14 of the chaise lounge 12, the chaise lounge can be collapsed in the normal fashion for transporter storage without taking any more room than it otherwise would without the foldable table attachment 10 of the invention. The table attachment 10 thus adds no size or bulk to the collapsed chaise lounge, very little weight and substantial function since it enables the support of articles on a firm flat surface which is wholly lacking in a conventional chaise lounge.

Whereas the invention has been shown and described in connection with a preferred embodiment thereof, it is apparent that many modifications, substitutions and additions may be made which are within the intended broad scope of the appended claims.

Thus there has been shown and described a foldable table attachment for a collapsible chair, which attachment meets all of the stated objects.

I claim:

1. In combination:
   a collapsible chair including a peripheral seat frame including opposite side bars, a flexible seat portion having top and bottom surfaces and spanning said side bars, leg and back support panels pivotally connected to opposite ends of said seat frame so as to be collapsible in generally stacked relation to top of said seat frame and a pair of folding leg structures pivotally connected to said seat frame and collapsible against the underside thereof,
   a table top having a top side and underside;
   connection means pivotally connecting said table top to a seat side bar of said collapsible chair for movement of said table top between a storage position in generally registered overlying engagement with one surface of said seat portion and a substantially horizontal use position extended transversely outwardly from the seat portion, said collapsible chair being free of arm members so that said table top is freely pivotable without obstruction between said storage position and said use position;

leg means operative to support said table top in the substantially horizontal use position; and means connecting said leg means to said table top for pivotal movement of said leg means between a storage position in adjacent generally parallel relation to said table top and a use position extended downwardly from said table top.

2. The combination of claim 1 wherein said table top comprises a generally U-shaped frame, having spaced apart legs with outer ends connected to another cross member and opposite free ends, and a top panel spanning said legs for supporting articles thereon.

3. The combination of claim 2 wherein said connection means comprises a pair of generally C-shaped brackets, each having a central portion adapted to be pivotally wrapped around a side bar and opposite free ends, and fastener means for securing the free ends of the table frame to the free ends of a respective C-shaped bracket.

4. The combination of claim 3 wherein the free ends of said C-shaped bracket are arcuate in shape to generally conform to the circumference of the free end of the table frame.

5. The combination of claim 4 wherein said fastener means comprises a nut and bolt insertable through registered holes in said C-shaped bracket and table frame.

6. The combination of claim 1 wherein said leg means comprises a generally U-shaped member pivotally attached to the underside of said table surface such that said "U" shaped member may be pivoted to lie substantially flat against said table underside.

* * * * *